US011288852B1

(12) United States Patent
Trim et al.

(10) Patent No.: US 11,288,852 B1
(45) Date of Patent: Mar. 29, 2022

(54) COGNITIVE LEADSPACE CHOREOGRAPHY

(71) Applicant: INTERNATIONAL BUSINESS MACHINES CORPORATION, Armonk, NY (US)

(72) Inventors: Craig M. Trim, Ventura, CA (US); Hernan A Cunico, Holly Springs, NC (US); Martin G. Keen, Cary, NC (US); Harry Hoots, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/086,596

(22) Filed: Nov. 2, 2020

(51) Int. Cl.
*G06T 11/00* (2006.01)
*G06T 11/60* (2006.01)
*H04L 67/306* (2022.01)
*H04L 67/50* (2022.01)

(52) U.S. Cl.
CPC .............. *G06T 11/60* (2013.01); *H04L 67/22* (2013.01); *H04L 67/306* (2013.01); *G06T 2200/24* (2013.01)

(58) Field of Classification Search
None
See application file for complete search history.

(56) References Cited

U.S. PATENT DOCUMENTS

| 7,006,091 | B2 | 2/2006 | Masera |
| 8,760,551 | B2 | 6/2014 | Haikin |
| 9,569,069 | B2 | 2/2017 | Balasaygun |
| 9,959,192 | B1* | 5/2018 | Burriesci ............... G06F 11/362 |
| 10,235,638 | B2 | 3/2019 | Maheshwari |
| 10,268,897 | B2 | 4/2019 | Cunico |
| 10,614,156 | B1* | 4/2020 | Stansell ................ G06F 40/117 |
| 11,042,600 | B1* | 6/2021 | Murali ................ G06F 16/9577 |
| 2004/0215608 | A1* | 10/2004 | Gourlay ............... G06F 16/951 |
| 2006/0280364 | A1 | 12/2006 | Ma |
| 2009/0019372 | A1* | 1/2009 | Chu ....................... G06Q 30/02 715/748 |

(Continued)

OTHER PUBLICATIONS

Disclosed Anonymously, "AI, Intent Data Boost New B2B Marketing Tools From Demandbase, Get Smart Content & Leadspace," Leadspace, Martech Today, https://resources.leadspace.com/in-the-news/ai-intent-data-boost-new-b2b-marketing-tools-leadspace, Printed Jun. 24, 2020, pp. 1-6.

(Continued)

*Primary Examiner* — Martin Mushambo
(74) *Attorney, Agent, or Firm* — John Noh (57) ABSTRACT

A method, a computer program product, and a computer system render an image included in requested data based on determined user preferences. The method includes determining elements in a preselected image designed to be included on a webpage that is being requested from a user utilizing a device configured to show the webpage. Each of the elements corresponds to a topic. The method incudes determining preferences associated with the user, the preferences indicative of topics of interest associated with the user. The method includes generating a modified version of the preselected image based on the elements and the preferences. The webpage is loaded on the device with the modified version of the preselected image being rendered.

20 Claims, 5 Drawing Sheets

(56) References Cited

U.S. PATENT DOCUMENTS

| | | | |
|---|---|---|---|
| 2015/0254711 A1* | 9/2015 | Chand | G06Q 30/0269 |
| | | | 705/14.53 |
| 2015/0256633 A1* | 9/2015 | Chand | G06Q 50/01 |
| | | | 382/103 |
| 2015/0269271 A1* | 9/2015 | Liu | G06F 16/972 |
| | | | 715/234 |
| 2016/0034437 A1* | 2/2016 | Yong | G06T 11/60 |
| | | | 715/202 |
| 2016/0350332 A1 | 12/2016 | Cunico | |
| 2017/0192983 A1* | 7/2017 | Weng | G06F 16/958 |
| 2018/0241660 A1 | 8/2018 | Fletcher | |
| 2019/0107925 A1 | 4/2019 | Cunico | |
| 2020/0007916 A1 | 1/2020 | Keen | |

OTHER PUBLICATIONS

Disclosed Anonymously, "Half Page Background Image," Printed Jun. 25, 2020, p. 1.

Grisby, "Responsive Images 101, Part 9: Image Breakpoints," Cloudfour, https://cloudfour.com/thinks/responsive-images-101-part-9-image-breakpoints/, Aug. 25, 2015, pp. 1-17.

Levine, "Startup YesPath Launches AI-Driven Platform That Automatically Targets Marketing Content," Martech: Marketing, https://martechtoday.com/startup-yespath-launches-ai-driven-platform-automatically-targets-marketing-content-1 69496, Mar. 21, 2016, pp. 1-5.

Mell et al., "The NIST Definition of Cloud Computing", National Institute of Standards and Technology, Special Publication 800-145, Sep. 2011, pp. 1-7.

\* cited by examiner

COGNITIVE LEADSPACE CHOREOGRAPHY

BACKGROUND

The exemplary embodiments relate generally to image manipulation, and more particularly to determining a manner in which to show an image to a user based on a user profile indicative of preferences of the user.

An entity such as a company, an organization, an individual, etc. may utilize marketing research to improve an engagement with users. For example, the entity may set up a website in which a user may visit and interact with data provided therein. For a webpage on the website, the portion having a significant visual engagement occurs at the top third or top half of the area of the webpage on the user's device that is immediately visible upon the webpage loading, referred to as a leadspace. In creating the webpage, an administrator of the webpage may include sensory features to provide an improved or more engaging user experience. For example, the webpage may include an image in the leadspace such as a trademark associated with the entity, an image linked to services offered by the entity, etc. There are many missed opportunities to further increase the engagement with the user, particularly through the image in the leadspace.

SUMMARY

The exemplary embodiments disclose a method, a computer program product, and a computer system for rendering an image included in requested data based on determined user preferences. The method comprises determining elements in a preselected image designed to be included on a webpage that is being requested from a user utilizing a device configured to show the webpage. Each of the elements corresponds to a topic. The method comprises determining preferences associated with the user, the preferences indicative of topics of interest associated with the user. The method comprises generating a modified version of the preselected image based on the elements and the preferences. The webpage is loaded on the device with the modified version of the preselected image being rendered.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for rendering an image included in requested data based on determined user preferences. As will be described in greater detail herein, the exemplary embodiments are configured to determine preferences of a user or features that increase an engagement by the user. The exemplary embodiments may provide a cognitive leadscape choreography where an image included in a leadscape for a portion of a webpage that is initially visible to the user is manipulated based on the preferences or features. As more information is available in determining the preferences or features, the exemplary embodiments may provide an increasing engagement and/or improved user experience when an image may be manipulated for rendering. Key benefits of the exemplary embodiments may include a personalized approach to providing sensory data to a user in a dynamic manner through monitoring user interactions and processing sensory data. Detailed implementation of the exemplary embodiments follows.

Conventional approaches to providing an image on a webpage may utilize a variety of factors that are impersonal and/or technical. For example, conventional approaches may utilize only technical parameters to determine how to display an image on a device based on display characteristics on the device such as resolution, viewable size, etc. With devices featuring more form fitting characteristics, the display may decrease where a display capacity is limited. The conventional approaches may maximize the impact that an image provides in light of these technical parameters such as through auto cropping. In another example, a conventional approach may determine an orientation that device is being used and consequently how a display is being see. The conventional approach may therefore alter the information being displayed. A variety of other conventional approaches may determine how and what type of information to display or present based various user characteristics, thereby selecting an image to be shown.

As those skilled in the art will appreciate, the manner in which a user is introduced to a webpage in the initial view on a display of a device being used by the user may impact the user's impression that may have a direct correlation to the user experience. Agencies may be retained on making designs that are most appealing, unique, and engaging for target audiences (e.g., users who visit the website). Those skilled in the art will appreciate the numerous ways for how an image is selected, techniques around a responsive design, designing a content choreography, and how to deal with keeping a message from that image to be meaningful independently of the screen size, resolution, or orientation on which the image is being shown. For example, website designers may use CSS to force a focus on a particular part of the image (e.g., top-center aligned).

In further conventional approaches, the issue that arises with forcing a focus is that the designs focus on a single point of interest (e.g., focus and breakpoints). That single point of interest is determined in advance by, for example, a website designer. With the website designer's perspective and intent for the user to focus on a particular point, the user visiting the website and a webpage thereof is not incorporated in the decision for the forced focus. That is, these designs do not target an individual user and the user's interests. Instead, the website designer focuses on the target audience as a group of users. Furthermore, as noted above in a differentiating factor between conventional approaches that intend on incorporating user characteristics, these techniques involve using the same image or a different size version of the same image across all users.

Despite various approaches to the above design choice, there are still further issues with such approaches. For example, although the forced focus does not necessarily require the focus to be centered on the webpage, the forced focus requires a single point of interest, in particular where the single point is a theme of the image. Again, in this approach, there is just one image for a target group of users, every user receives the same image and focus on the image, and, as a result, there is no personalized experience for any of the users.

In contrast, if an approach utilizes different images, the user experience is not consistent. In addition, the approach utilizing different images is more expensive with increased costs (e.g., technical costs) since additional images are required to be acquired and focus points in each image must be identified. An example illustrating the varied user experience and inconsistency, an image analysis from psychology practices may be utilizes. For example, a Rorschach test involves an individual viewing an image, the individual interpreting the image, and providing what the individual is seeing. In viewing an image in the Rorschach test, different individuals will have different interpretations of the image and will also be drawn to different portions of those images. Furthermore, when users view a leadspace that appears busy with many different potential focus points, each user visiting the webpage may be drawn toward different areas of the image and therefore have different focus points. For example, a webpage may include an image of a wide variety of cooking ingredients. A first user may focus on basil and dry pasta while a second user may focus on Himalayan pink salt and olives, entirely different focus points.

As described above, when a single image is used for a webpage design with a designer's selection as the focus of the image in the leadspace, the user experience is impersonal that is not tailored for any specific user visiting the website and viewing the webpage. When multiple images are used, the user experience for a plurality of users becomes inconsistent and increases costs with each additional image that is to be used. When a single image with multiple focus points is used, the user experience for a plurality of users again becomes inconsistent as the focus point varies among the users Thus, to balance costs while attempting to maximize engagement, conventional approaches may define one focus area (e.g., as selected by a designer) and a set of breaking points that are common across all users visiting the website. The only variable that may dictate the image treatment may be the device and/or screen resolution from where the image is being viewed.

In contrast to conventional approaches, the exemplary embodiments may provide a dynamic solution that personalizes an image for a user that also incorporates a design intended to be shown by the webpage. As will be described in detail below, the exemplary embodiments may manipulate an image to be shown in a leadspace of the webpage by determining characteristics of the image that was selected for the webpage by ranking and mapping categorized elements of the image or a visual array, determining various ways to manipulate the image, selecting display characteristics for how the image is to be shown based on a user profile of the user requesting the webpage, and rendering the image based on the selected display characteristics. In this manner, each website and webpages thereof may provide an initial display of the webpages that is tailored for the user to increase engagement while also retaining predefined aspects designed for the website. The exemplary embodiments may perform dynamic and micro-based adjustments to crucial attributes of visual arrays and arrive at a single adjustment tailored to an individual user.

According to the exemplary embodiments, the focus and breakpoints as well as other arrays may be dynamically determined based on determined understandings of each user on an individual basis, learned preferences for each user, and previous successful engagements with each user. In this manner, the exemplary embodiments may, for example, re-center the leadspace to best serve an individual user. If the leadspace requires resizing, the focus area may remain on a portion of the image that is of most interest or would be more likely to drive and retain engagement with a particular user.

The exemplary embodiments are described with regard to a leadspace of a webpage and an image selected to be shown on the webpage. However, the use of the leadspace, the webpage, and the image is only exemplary. The exemplary embodiments may be utilized and/or modified to dynamically modify sensory data that is included in requested data. For example, a user may request any data from any entity that may include an image. The exemplary embodiments may utilize the features described herein for webpages or any other requested data. In another example, the webpage may include auditory data to be played upon opening the webpage. The exemplary embodiments may utilize the features described herein for different types of sensory data such as visual data included in images, auditory data included in sounds, etc. In a further example, the webpage may include various sections such as the leadspace, a background, a popup window area, a popup bubble window (e.g., when an area is hovered), etc. The exemplary embodiments may be utilized for any section of the webpage that is or will be viewed by the user requesting the webpage. The exemplary embodiments may be configured to be utilized in any combination of the examples described above. Accordingly, the exemplary embodiments being described with regard to webpages and images in a leadspace is for illustrative purposes and is only representative of how the exemplary embodiments may be utilized and/or modified, particularly to one skilled in the art.

Figure 1:
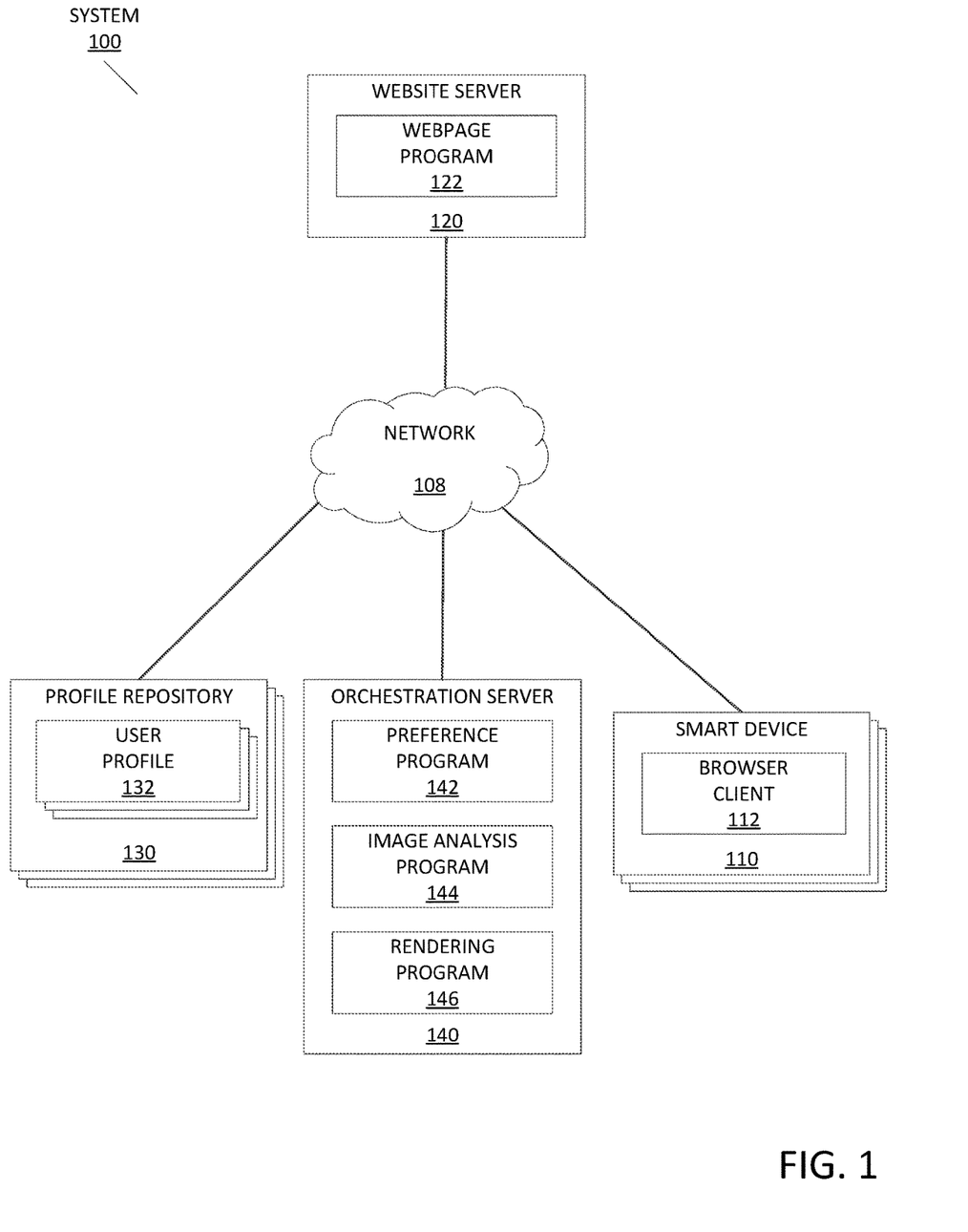
FIG. 1 depicts an exemplary schematic diagram of a leadspace orchestrating system 100, in accordance with the exemplary embodiments.

FIG. 1 depicts a leadspace orchestrating system 100, in accordance with the exemplary embodiments. According to the exemplary embodiments, the leadspace orchestrating system 100 may include one or more smart devices 110, a webpage server 120, one or more profile repositories 130, and an orchestration server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the leadspace orchestrating system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the leadspace orchestrating system 100 that do not utilize the network 108.

In the exemplary embodiments, the smart device 110 may include a browser client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, a console, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the browser client 112 may act as a client in a client-server relationship and may be a software, hardware, and/or firmware based application capable of requesting a website or a webpage thereof via the network 108. In embodiments, the browser client 112 may operate as a user interface in which the website and webpage may be viewed by a user utilizing the smart device 110, and utilize various wired and/or wireless connection protocols for data transmission and exchange associated with orchestrating a leadspace, including Bluetooth, 2.4 gHz and 5 gHz internet, near-field communication, Z-Wave, Zigbee, etc.

The user may utilize the browser client 112 to request a website or a specific webpage of the website. The browser client 112 may receive data from a network device that is hosting the website and render a webpage on the user interface of the browser client 112. The user may then navigate through the webpage. For example, the user may scroll through the webpage, select an image or link and be redirected to another webpage, etc. In rendering the webpage, the browser client 112 may receive images and/or other sensory data that is to be displayed and/or played out when the webpage has loaded.

As the exemplary embodiments are directed toward a leadspace of a webpage, the smart device 110 may include the browser client 112. However, the use of the browser client 112 is only for illustrative purposes. The browser client 112 may represent any component configured to render an image for a user to view upon requesting data, whether the image is viewed on a webpage or otherwise. The browser client 112 may have preselected viewing parameters and may also incorporate technical parameters of the display of the smart device 110. Thus, any corresponding application that is represented by the browser client 112 that renders images may also be configured with preselected viewing parameters and incorporate technical parameters of the display of the smart device 110.

In the exemplary embodiments, the website server 120 may include a webpage program 122 and act as a server in a client-server relationship with the browser client 112 as well as act as a client in a client-server relationship and may be a software, hardware, and/or firmware based application capable of hosting a website including one or more webpages via the network 108. The website server 120 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the website server 120 is shown as a single device, in other embodiments, the website server 120 may be comprised of a cluster or plurality of computing devices, working together or working independently. The website server 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the webpage program 122 may host the website associated with an entity, individual, organization, company, etc. Based on the purpose of that the website is configured to provide, the website may include various information that is displayed for the user to interact (e.g., read, engage through inputs such as game, redirect to other information, etc.). The webpage program 122 may be configured to generate the one or more webpages of the website when receiving a request from the browser client 112. For example, a user may enter a url in the browser client 112. The url may be routed through the network 108 and the appropriate website server 120 may be reached such that the webpage program 122 may provide a corresponding webpage. In another example, a user may select a link or provide any other type of input that directs the user to a particular webpage. The request for the webpage may reach the website server 120 and the webpage program 122 may provide a corresponding webpage. Those skilled in the art will understand the various operations and processes that are involved in providing a webpage to a user based on the request that is received.

The webpage program 122 may also be configured to generate the webpage based on various predetermined parameters. For example, a designer of the website may determine a format in which the webpage is to be presented. For example, the webpage program 122 may dynamically generate the webpage based on technical parameters of display factors of the smart device 110. In an exemplary implementation, the browser client 112 may include the technical parameters of the smart device 110 in the request for the webpage. In another exemplary implementation, as a result of receiving the request for the webpage, the webpage program 122 may transmit a request for the technical parameters to the browser client 112 of the smart device 110. Based on the technical parameters, the webpage program 122 may generate the webpage accordingly so that an intended view of the webpage is provided. In another example, the designer of the website may select an image that is to be included in the leadspace or the portion of the webpage that is initially or subsequently visible to the user once the webpage is loaded or while the webpage is loading. The image may be predetermined and to be utilized for each user visiting the webpage.

In the exemplary embodiments, the profile repository 130 may include one or more user profiles 132 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 130 is shown as a single device, in other embodiments, the profile repository 130 may be comprised of a cluster or plurality of electronic devices, in a modular manner, etc., working together or working independently. While the profile repository 130 is also shown as a separate component, in other embodiments, the profile repository 130 may be incorporated with one or more of the other components of the leadspace orchestrating system 100. For example, the profile repository 130 may be incorporated in the orchestration server 140. Thus, access to the profile repository 130 by the orchestration server 140 may be performed locally. In another example, the user profiles 132 represented in the profile repository 130 may be incorporated in respective ones of the smart device 110 (e.g., each smart device 110 has a profile repository 130 including at least the user profile 132 of the user who is respectively associated). Thus, access to the profile repository 130 and to a specific one of the user profiles 132 may be performed through a transmission or access from the smart device 110. The profile repository 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the user profiles 132 may each be associated with a respective user of the smart devices 110 that provide webpages generated by the webpage program 122 of the website server 120. The user profiles 132 may be populated with various types of information. Specifically, the user profiles 132 may include information relevant to determining preferences of the corresponding user. For example, the user profiles 132 may include a browsing history that indicates previous websites and webpages along with associated information (e.g., service the website provides, service the organization associated with the website provides, frequency of visits, activity during visits, etc.). In this manner, the browsing history may be indicative of topics of interest for the user based on topics of the visited websites, general topics for which the visited websites are directed, etc. In another example, the user profiles 132 may include sensory information of the user while navigating the visited websites. The sensory information may include various types such as heat maps, eye tracking information, uttered words and/or sounds, etc. In this manner, the sensory information may be indicative of how the user is feeling or focused during a time the user is engaging the visited websites. This may, in turn, be used to determine topics of interest, preferences of corresponding sensory characteristics (e.g., bright colors vs. black and white, large images vs. small images, genre of music, subtle sounds vs. loud sounds, etc.), other types of preferences (e.g., navigation format, like or dislike of bubbles providing instructions or details, etc.), etc. Those skilled in the art will understand the various other types of information that may be stored in the user profiles 132 such that preferences of the user including topics of interest may be determined in subsequent operations. Accordingly, the user profiles 132 may provide information regarding preferences for respective users that may be directly related to the website hosted by the website server 120 or indirectly related to other websites (e.g., websites that have never been visited by the user).

In the exemplary embodiments, the orchestration server 140 may include a preference program 142, an image analysis program 144, and a rendering program 146, and act as a server in a client-server relationship with the webpage program 122 as well as be in a communicative relationship with the profile repository 130. The orchestration server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the orchestration server 140 is shown as a single device, in other embodiments, the orchestration server 140 may be comprised of a cluster or plurality of computing devices, working together or working independently. While the orchestration server 140 is also shown as a separate component, in other embodiments, the operations and features of the orchestration server 140 may be incorporated with one or more of the other components of the leadspace orchestrating system 100. For example, the operations and features of the orchestration server 140 may be incorporated in the smart device 110, particularly the smart device 110 of the user requesting a webpage. In such an implementation, the features of the exemplary embodiments may be provided through an application installed on the smart device 110 (e.g., as a default application pre-installed, manually installed by the user, etc.). In another example, the operations and features of the orchestration server 140 may be incorporated in the website server 120. In such an implementation, the features of the exemplary embodiments may be provided as a service incorporated in providing the webpages by the website server 120. The orchestration server 140 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the preference program 142 may be a software, hardware, and/or firmware application configured to determine preferences for each of the users utilizing the smart devices 110. Specifically, the preference program 142 may update and maintain the user profiles 132. The preference program 142 may perform a variety of monitoring operations based on sensory and/or activity information from the user and/or smart device 110 as well as from the website server 120.

The preference program 142 may perform the monitoring operations for each individual user such that a respective user profile 132 may be created indicative of corresponding preferences. The preference program 142 may have access to data generated from monitor user online activities from which common topics and areas/elements of interest may be extracted. In extracting the topics of interest, the preference program 142 may be configured with various analyzing techniques such as semantic analysis, natural language processing, etc. to identify the most common topics from the online activities (e.g., websites that are visited, content which is requested, etc.). The preference program 142 may analyze how the topics are being consumed by the user. For example, the preference program 142 may analyze search strings, identify websites visited and type of information that is predominantly presented, identify types of content visited (e.g., what communication channels), measure time spent on topics, determine a frequency of visits to each website, etc. In this manner, the preference program 142 may derive a preliminary set of topics of interest.

The preference program 142 may further utilize sensory information gathered about the user while having visited the websites. For example, the sensory information may include heat maps, eye tracking information, etc. to identify the content that receives the most attention from this user and the location on the website. The smart device 110 may be configured with various sensors that are configured to capture and generate the sensory information. For example, the smart device 110 may include an imager or eye tracking component to determine where the user is focusing while having visited websites. In another example, the smart device 110 may include an audio receiving device (e.g., a microphone) configured to capture uttered words and/or sounds while having navigated a website.

With regard to the sensory information including visual information and a visual focus on a visited website, the preference program 142 may associate topics of interest with the visual focus. The preference program 142 may be configured to utilize artificial intelligence techniques including neural networks (e.g., convolution neural networks, recurrent neural networks, etc.) to analyze and classify the visual content presented to the user on the websites that were visited. In this manner, the preference program 142 may determine a holistic portrayal of what the user is viewing and on what the user is focusing (e.g., catches the user's attention).

The preference program 142 may further utilize user reactions (e.g., other sensory information) to annotate positive and/or negative responses as a function of context and visual focus. The preference program 142 may generate a correlation matrix with the content analysis, focus area, image analysis, user reaction, etc. and store the results in the user profile 132 corresponding to the user. The user profile 132 may include a table with columns and rows including the various preference parameters and the results of the monitoring of the user while having visited the web sites. For example, the table may include a user identity, a channel, a topic, a focus, a size, an image classification, a user response, etc.

In entering values to the table and/or the user profile 132, the preference program 142 may further process the websites that are visited and the classification of images (e.g., topics for which the images may be directed) that are being viewed intently, altogether ignored, and any focus amount therebetween. The preference program 142 may utilize one or a combination of convolutional neural networks, recurrent neural networks, or any other neural network variation and/or artificial intelligence technique for visual processing. An exemplary implementation where the neural networks may be applied include when the user is monitored to analyze content being consumed by the user. Another exemplary implementation where the neural networks may be applied include analyzing the content that the preference program 142 may enhance to maximize user engagement. Those skilled in the art will appreciate that the neural networks may enable various processing of the information for visited websites such as visual processing (e.g., process images and videos on their own as well as the entire screen), classification and categorization (e.g., identify what is on each image and part of the screen), context processing (e.g., aggregate the classification and categorization and derive a theme that is used to correlate with the topic analysis), creating a reference matrix with annotations from the resulting analysis, etc. For example, the preference program 142 may capture size, location, color predominance, object predominance, scene, theme, context, etc. In an exemplary further table of this processing, the further table may include object type, object dimension, object location, color predominance, object predominance, user response, etc.

Using the above mechanisms, the preference program 142 may maintain and update the user profile 132 to reflect current preferences exhibited by the user including topics of interest, topics that are not of interest, a general preference profile (e.g., animals that are liked, feared, etc.; color palette preference; etc.). As will be described in detail below, the user profile 132 may provide a basis on which the exemplary embodiments may manipulate an image that is selected to be shown on a webpage for a current request to render an appropriate modified version of the image that maximizes engagement by the user viewing the webpage.

In the exemplary embodiments, the image analysis program 144 may be a software, hardware, and/or firmware application configured to process images included in a webpage of a website hosted by the website server 120 that is being requested by a user utilizing the browser client 112 of the smart device 110. The image analysis program 144 may therefore determine the different ways that the image on the webpage may be modified such as selection of a portion of the image, available movement oriented changes (e.g., pan, tilt, zoom, etc.), etc.

In an exemplary operation, the image analysis program 144 may perform a website data analysis. The image analysis program 144 may receive an indication that the browser client 112 has transmitted a request for a webpage. The image analysis program 144 may analyze the entire webpage (e.g., including the portion that may become the leadspace) and the content as the user may view the webpage. For example, in the request for the webpage or through a subsequent exchange, the image analysis program 144 may receive technical parameters of the smart device 110 and the browser client 112. The image analysis program 144 may utilize the technical parameters or a predetermined manner in which the webpage will be viewed as the smart device 110 and/or the browser client 112 may require the image on the webpage to be altered in an initial manner (e.g., truncated, re-sized, etc.).

For each webpage that is requested, the image analysis program 142 may perform a plurality of operations including an image processing, an image classification and categorization, a context processing (e.g., derive a theme from a combination of text and/or image analysis), a defining of boundaries (e.g., by topic, scene, element, etc.), etc. For each object that is identified, the image analysis program 142 may determine how the element may be altered (e.g., whether the element may be rotated, flipped, etc.) on its own and/or with other adjacent elements. The image analysis program 142 may annotate the elements with the results of this analysis. For example, the image may capture a scene where a child is playing with a ball and a dog in a park that has trees. The image analysis program 144 may identify the various objects including the child, the ball, the dog, the park, and the trees as well as any other identifiable object (e.g., a trail, a fountain, etc.). Although the image analysis program 144 may determine the portion of the image of the website that encompasses a visible area on the smart device 110, the image analysis program 144 may still extend the analysis to the entirety of the webpage and/or the image to determine the actions for each element and the context of each image as well as the topic, intention, sentiment, context, etc. For example, the ball being circular (e.g., as shown on a two-dimensional representation in the image) may be flipped or rotated in any direction (e.g., assuming no identifying marks such as trademarks, words, etc. are on the ball). However, the child, the dog, and the trees may only be flipped along a vertical axis (e.g., flipping along a horizontal axis may result in these elements being upside down, rotating these elements would skew the presentation, etc.). The elements may also be combined for the image manipulation. For example, the child and/or the dog may be flipped individually but not if both are together as determined by context.

In another exemplary operation, the image analysis program 144 may perform a customization of rendering rules based on context. In this operation, the image analysis program 144 may define specific and/or general rendering rules for each of the elements identified in the above analysis based on the individual characteristics of those elements. In an exemplary process, the image analysis program 144 may apply general handling rules. For example, for each element, the image analysis program 144 may determine whether the element may be flipped and in which direction, an amount that the image may be cropped before the image loses its meaning (e.g., topic identity), an amount that an element may be zoomed into or out before the quality degrades (e.g., the element is no longer recognizable), whether the element may be rotated and in which direction (e.g., along any axis such as x, y, or z), etc. Depending on the analyzed interaction between elements, the image analysis program 144 may determine whether certain elements may be presented in isolation or must be presented as a group based on context (e.g., must be shown with one or more other elements). These rules may be initially set but may also be learned over time and new rules may be derived from new user interactions.

Through this operation, the image analysis program 144 may define new potential focus points, panning and tilting preferences, other image manipulations, etc. The image analysis program 144 may annotate the elements to be used in a subsequent operation. For example, the image analysis program 144 may define rendering rules in a table including elements such as theme coordinates, cropping limits, focus point coordinates, a focus point theme, a focus point quality index, rendering restrictions, etc.

In the exemplary embodiments, the rendering program 146 may be a software, hardware, and/or firmware application configured to determine how to modify the image on the webpage so that the user is more engaged with the webpage. The rendering program 146 may utilize the user profile 132 corresponding to the user requesting the webpage as maintained by the preference program 142 and the results of the image analysis program 144. Specifically, the rendering program 146 may perform a cognitive choreography for the leadspace of the webpage.

The rendering program 146 may perform this operation in a variety of ways. As described above, the orchestration server 140 or the rendering program 146 may be a separate component, incorporated with the website server 120, and/or incorporated with the smart device 110. Based on the arrangement of the orchestration server 140 or the rendering program 146, the rendering program 146 may perform respective steps in the operation. For example, as a separate component, the rendering program 146 may generate instructions for the website server 120 and/or the smart device 110 so that the modified version of the image is shown on the webpage when the webpage is loaded on the browser client 112. In another example, in being incorporated with the website server 120, the rendering program 146 may generate the modified version of the image and the modified version may be supplied to the browser client 112 for rendering. In a further example, in being incorporated with the smart device 110, the rendering program 146 may receive the image selected for the webpage, perform the appropriate modification, and load the modified version of the image with the webpage. Based on the arrangement, there may entail further steps. For example, in being incorporated with the smart device 110, the user may opt into the use of the features of the exemplary embodiments where agents may be installed on the smart device 110 to facilitate monitoring and customized rendering logic. In another example, in being incorporated with the website server 120, the user may log into the browser client 112 and each request for webpages may allow for monitoring and enabling personalized rendering.

Independent of the arrangement of the orchestration server 140 or the rendering program 146, the rendering program may predict the parts of the current content in the image of the webpage that may be most supporting and engaging for the user requesting the webpage. For example, a website may be related to animals. The image to be loaded for a webpage on the website may include dogs and cats. As indicated in respective user profiles 132, a first user that requests the webpage may be a dog person while a second user may be afraid of dogs. Based on this information, the rendering program 146 may predict the type of reaction for each of the users and therefore update the focus points accordingly. For example, for the first user, the rendering program 146 may select one dog in the image such that the modified version of the image crops the remaining animals and includes only the selected dog. In another example, for the second user, the rendering program 146 may select one cat in the image such that the modified version of the image crops the remaining animals, particularly the dogs, and includes only the selected cat.

In determining the modified version of the image selected for the webpage, the rendering program 146 may perform a ranked cross-reference between the elements identified in the current content of the image as determined by the image analysis program 144 and the user interest determined by the preference program 142 may stored in the user profile 132. The ranking may be based on the user response where positive responses to certain themes and object types may rank higher.

In identifying the elements that would be most appealing, within context, to each specific user visiting the webpage, the rendering program 146 may apply rendering logic following the re-definitions calculated in the above described operations. For example, the rendering program 146 may determine which of the identified elements in the image of the webpage match user interests as indicated in the user profile 132. The rendering program 146 may also determine how each of the determined elements matching the user interests may be modified through various treatments such as those described above. The rendering program 146 may further determine user preferences with regard to how images are presented as well as incorporating technical parameters of the smart device 110 on which the request for the webpage is transmitted (e.g., size, color palette, etc.). Based on these determinations, the rendering program 146 may apply one or more treatments (e.g., width, height, margin, border, zooming, rotating, cropping, etc.) so that the user is presented with a modified version of the image selected for the webpage such that the leadspace that is initially shown or subsequently shown at any later time (e.g., after the user scrolls down for another portion of the webpage to be seen) includes the modified version of the image.

Figure 2:
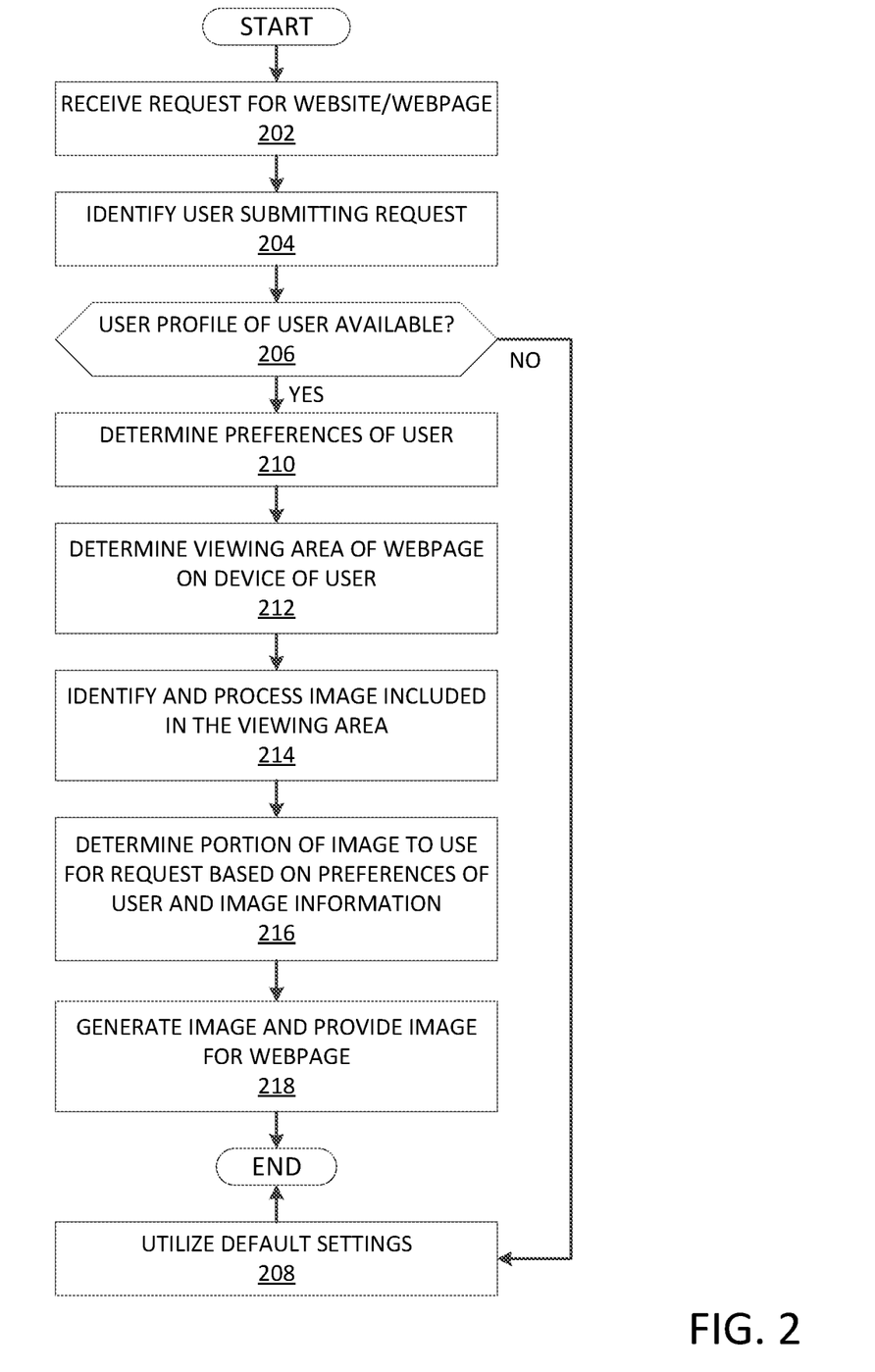
FIG. 2 depicts an exemplary flowchart of a method illustrating the operations of an orchestration server 140 of the leadspace orchestrating system 100 in rendering an image included in requested data based on determined user preferences, in accordance with the exemplary embodiments.

FIG. 2 illustrates an exemplary flowchart of a method 200 illustrating the operations of the orchestration server 140 of the leadspace orchestrating system 100 in rendering an image included in requested data based on determined user preferences, in accordance with the exemplary embodiments. Specifically, the method 200 describes the operations performed by the preference program 142, the image analysis program 144, and the rendering program 146. The method 200 will be described from the perspective of the orchestration server 140. The method 200 will also be described according to an arrangement where the orchestration server 140 and its operations are incorporated in the website server 120. However, as noted above, the exemplary embodiments may utilize other arrangements such as the orchestration server 140 being a separate component, being incorporated in the smart device 110, etc.

The orchestration server 140 may receive a request for a website or a webpage of the website (step 202). A user utilizing the browser client 112 of the smart device 110 may enter a url or select a link that is formatted as a request for a corresponding webpage that is transmitted to the website server 120 via the network 108. To prepare for loading the webpage on the browser client 112, the orchestration server 140 may receive an indication that the request was received which identifies the webpage to be provided.

The orchestration server 140 may identify the user submitting the request for the webpage (step 204). The orchestration server 140 may identify the user in a variety of ways. For example, the browser client 112 may load a web browser application in which the user performs a login prior to further use. Thus, any request for a webpage may include the user's identity (e.g., indicated in a header of the request). In another example, the location of the smart device 110 or other identifying characteristic may be received (e.g., MAC address, GPS location, etc.). The orchestration server 140 may utilize information (e.g., stored in the user profiles 132) to match the location or identifying characteristic to determine which user is transmitting the request.

Based on the identified user, the orchestration server 140 may determine whether a user profile 132 corresponding to the user is available (decision 206). For example, the orchestration server 140 may maintain and update a plurality of the user profiles 132 that correspond to an individual user. However, there may be instances where the user is a fresh user or unidentifiable such that there is no user profile 132 that is available. As a result of no user profile 132 being available for the identified user (decision 206, "NO" branch), the orchestration server 140 may defer to utilizing default settings (step 208). For example, the default settings may entail an image that is selected for the website to be shown based on the webpage designer's selection (e.g., in its entirety without any treatments).

As a result of the user profile 132 being available for the identified user (decision 206, "YES" branch), the orchestration server 140 may determine preferences of the user (step 210). As described above, the orchestration server 140 may determine the preferences of the user by maintaining and updating the user profile 132 associated with the user. For example, the orchestration server 140 may receive information regarding historical consumption of webpages or perform various monitoring operations. The historical consumption may include websites and/or webpages that are visited along with other relevant information (e.g., frequency of visits, topics of the websites and/or webpages, etc.). The orchestration server 140 may also utilize sensory information such as areas of webpages and/or images displayed on the webpages along with corresponding topics to which these areas are directed. Further preferences may also be determined such as via the sensory information. In addition, the user profiles 132 may be populated with other available information. For example, a user may volunteer information that may be incorporated into the user profile 132. In another example, publicly available information (e.g., information accessible to the general public such as through a public setting on a social media website) may be used to determine preferences of the user (e.g., a job title may indicate a proficiency in a technical field that may be used to determine an interest in the technical art).

The orchestration server 140 may determine a viewing area of webpage on the smart device 110 that is being utilized by the identified user (step 212). The orchestration server 140 and/or the website server 120 may receive technical parameters of the smart device 110 from which the request was received regarding how the webpage may be displayed upon loading. For example, in the request, the smart device 110 may include the technical parameters. In another example, the orchestration server 140 and/or the website server 120 may request the technical parameters and receive a response from the smart device 110.

The orchestration server 140 may identify and process an image that is preselected to be included in the viewing area (step 214). The exemplary embodiments are configured to provide the webpage with a modified version of an image that is to be shown on the smart device 110. For example, the image may be in a leadspace of the webpage in an initial view of the webpage on the smart device 110. The orchestration server 140 may further process the image to determine the various elements that are present in the portion or entirety of the image that is shown. The orchestration server 140 may also determine how each element may be manipulated with one or more image treatments where image treatments represents modifiable attributes of the image in which the modifiable attributes retain a context of the elements in the image (e.g., boundaries, cropping, rotating, etc.). The orchestration server 140 may further determine the topics for which the elements are related.

The orchestration server 140 may determine a portion of image to use for the request based on the determined preferences of user and the processed image information (step 216). For example, the preferences may indicate topics of interest of the user. The orchestration server 140 may identify one or elements in the image that match the preferences. The orchestration server 140 may then apply image treatments that also correspond to the preferences. For example, the orchestration server 140 may crop the image to isolate one or more elements and perform further treatments to generate a modified version of the preselected image to be used with the webpage.

The orchestration server 140 may generate the modified version of the image and provide the modified version of the image for the webpage (step 218). In transmitting the data to load the webpage on the smart device 110, the orchestration server 140 may replace the preselected image with the modified version of the image. In this manner, the user may be presented with the preselected image that is designed to increase a user engagement and provide an improved user experience.

To further illustrate the operations of the orchestration server 140, reference is now made to an illustrative exemplary embodiment. According to the illustrative exemplary embodiment, a webpage being requested may be for Formula One Racing. The webpage may include an image that is preselected to be included in the webpage. The image may include a plurality of race cars with various makes/models, brands, sponsors, etc. The preferences of the user may indicate a preference for a particular make/model, brand, sponsor, etc. Accordingly, the orchestration server 140 may generate a modified version of the image to re-center a focus on a preferred make/model while removing other makes/models that the user may not have a particular preference.

According to another illustrative exemplary embodiment, a webpage being requested may be for barbecuing or grilling. The webpage may include an image that is preselected to be included in the webpage. The image may include a grill surface with various grilling food items such as steaks, vegetables, kebabs, etc. The preferences of the user may indicate a preference for a particular food group. Accordingly, the orchestration server 140 may generate a modified version of the image to re-center a focus on a preferred food group while removing other food groups that the user may not have a particular preference.

The exemplary embodiments are configured to render an image included in requested data based on determined user preferences. The exemplary embodiments may perform an analysis of user behavior and derived interests that are stored in a user profile indicative of preferences. The exemplary embodiments may perform an analysis and classification of an image that is preselected for the webpage to derive the characteristics of the objects shown. The exemplary embodiments may perform a correlation of user preferences to classifications in the preselected image on the webpage that is requested. The exemplary embodiments may perform a real-time rendering of the image into a modified version of the original image to retain user-specific classifications through re-focusing, cropping, panning, and tilting as well as other types of image treatments.

In this manner, the exemplary embodiments allow for an enhanced user experience while still using a single set of images by dynamically defining multiple custom focus areas and breakpoints derived from user preferences. This in turn results in better targeting, increased user interest, and retention. According to an exemplary implementation where the image of a leadspace is targeted, the exemplary embodiments may a focus on a top portion of a Digital Marketing Funnel where an objective is to increase the user engagement and reduce bounce rates, thus resulting in more conversions. Furthermore, as the exemplary embodiments relate to generating a modified version of a preselected image for a webpage, the exemplary embodiments may be applied to any webpage and any image included in the webpage.

Figure 3:
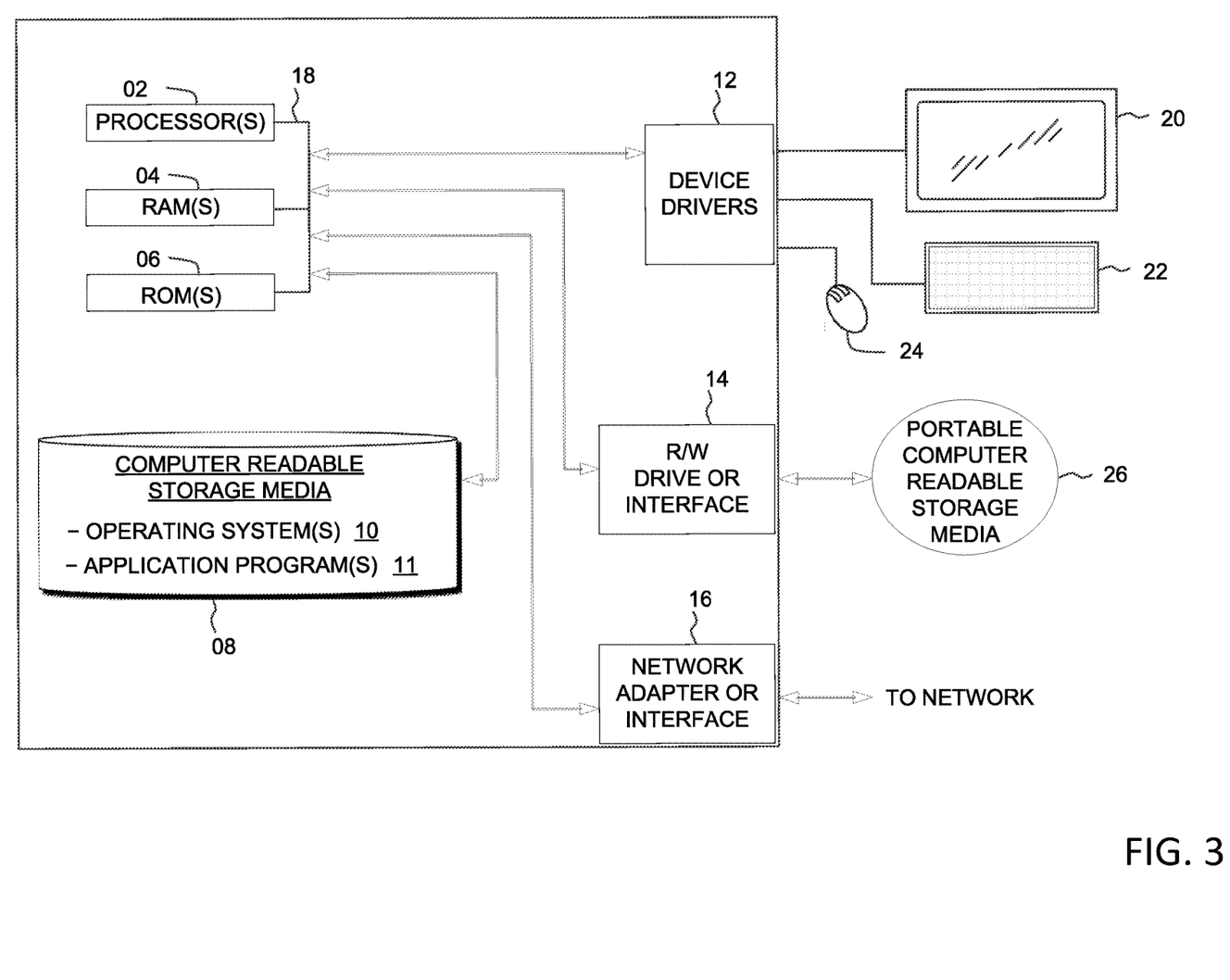
FIG. 3 depicts an exemplary block diagram depicting the hardware components of the leadspace orchestrating system 100 of FIG. 1, in accordance with the exemplary embodiments.

FIG. 3 depicts a block diagram of devices within the leadspace orchestrating system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
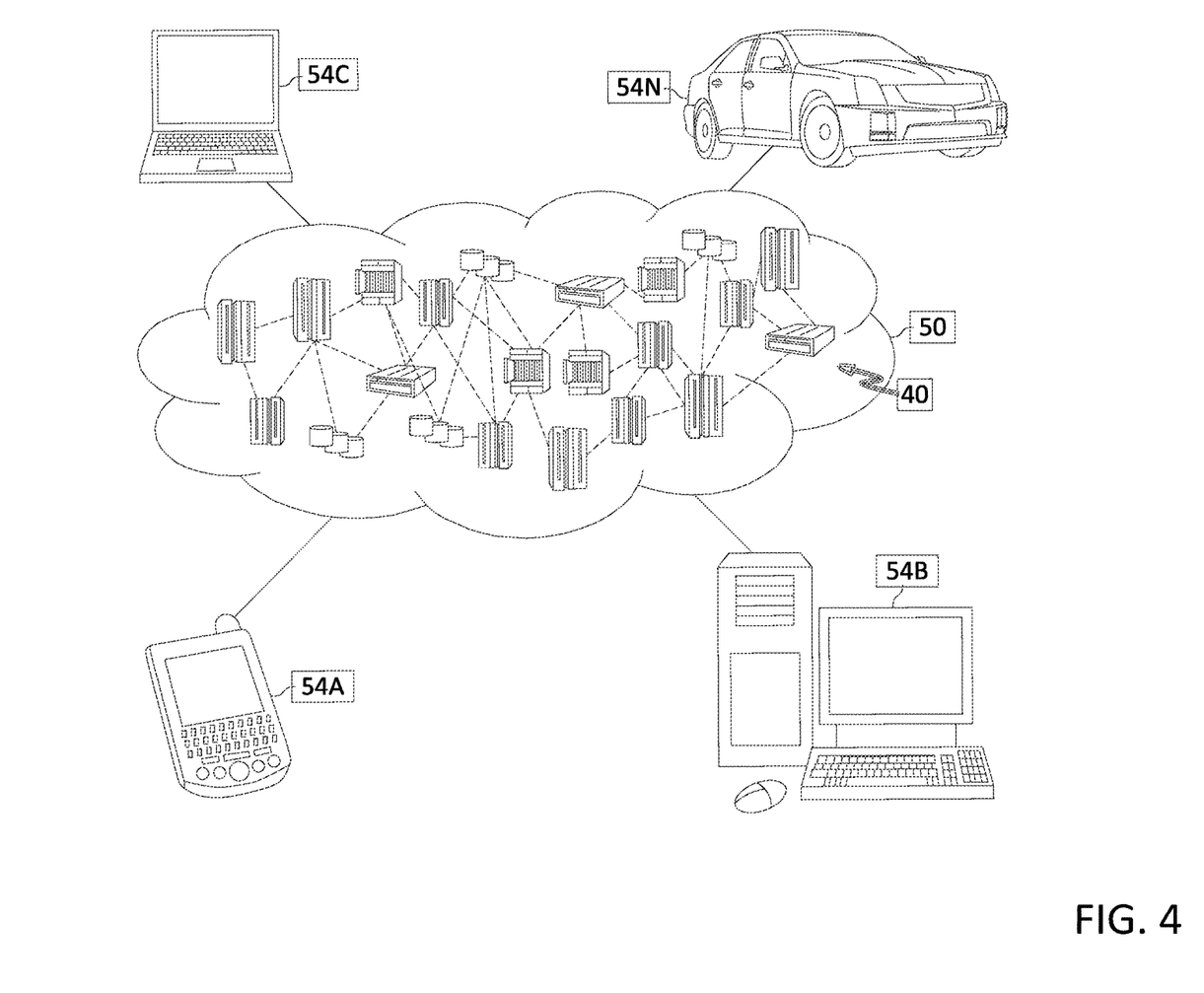
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
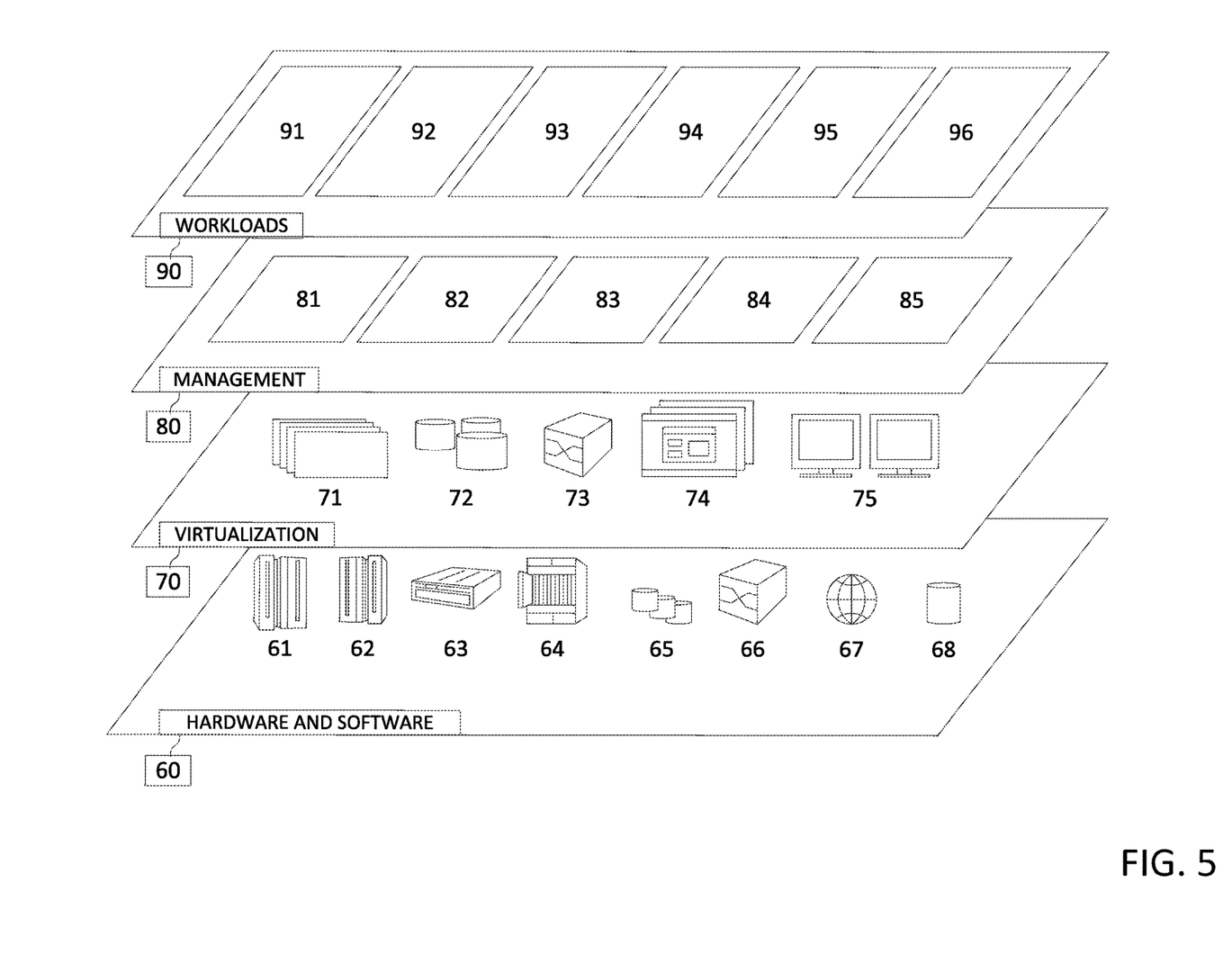
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and leadspace choreography processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for rendering an image included in requested data based on determined user preferences, the method comprising:
   determining elements in a preselected image designed to be included on a webpage that is being requested from a user utilizing a device configured to show the webpage, each of the elements corresponding to a topic;
   determining preferences associated with the user, the preferences indicative of topics of interest associated with the user; and
   generating a modified version of the preselected image based on the elements and the preferences, the modified version of the preselected image showing one of the elements of the preselected image with the topic that corresponds to one of the topics of interest associated with the user such that a further one of the elements of the preselected image is not visible,
   wherein the webpage is loaded on the device with the modified version of the preselected image being rendered.

2. The computer-implemented method of claim 1, further comprising:
   determining technical parameters of the device, the technical parameters indicative of display characteristics of the webpage.

3. The computer-implemented method of claim 2, further comprising:
   determining modifiable attributes of the elements, the modifiable attributes retaining a respective context of the elements.

4. The computer-implemented method of claim 3, wherein the modified version of the preselected image is generated with at least one image treatment based on the modifiable attributes, the image treatment including at least one of a re-focusing, a cropping, a panning, a tilting, a zooming in, a zooming out, a rotating, and a flipping.

5. The computer-implemented method of claim 1, wherein the preferences are based on at least one of a browsing history of the user and sensory information associated with the browsing history.

6. The computer-implemented method of claim 1, wherein the image is in a leadspace of the webpage.

7. The computer-implemented method of claim 1, wherein the method is one of a client-side set of operations performed on the device or a server-side set of operations performed on a website server hosting the webpage.

8. A computer program product for rendering an image included in requested data based on determined user preferences, the computer program product comprising:
   one or more non-transitory computer-readable storage media and program instructions stored on the one or more non-transitory computer-readable storage media capable of performing a method, the method comprising:
      determining elements in a preselected image designed to be included on a webpage that is being requested from a user utilizing a device configured to show the webpage, each of the elements corresponding to a topic;
      determining preferences associated with the user, the preferences indicative of topics of interest associated with the user; and
      generating a modified version of the preselected image based on the elements and the preferences, the modified version of the preselected image showing one of the elements of the preselected image with the topic that corresponds to one of the topics of interest associated with the user such that a further one of the elements of the preselected image is not visible, wherein the webpage is loaded on the device with the modified version of the preselected image being rendered.

9. The computer program product of claim 8, wherein the method further comprises:
   determining technical parameters of the device, the technical parameters indicative of display characteristics of the webpage.

10. The computer program product of claim 9, wherein the method further comprises:
    determining modifiable attributes of the elements, the modifiable attributes retaining a respective context of the elements.

11. The computer program product of claim 10, wherein the modified version of the preselected image is generated with at least one image treatment based on the modifiable attributes, the image treatment including at least one of a re-focusing, a cropping, a panning, a tilting, a zooming in, a zooming out, a rotating, and a flipping.

12. The computer program product of claim 8, wherein the preferences are based on at least one of a browsing history of the user and sensory information associated with the browsing history.

13. The computer program product of claim 8, wherein the image is in a leadspace of the webpage.

14. The computer program product of claim 8, wherein the method is one of a client-side set of operations performed on the device or a server-side set of operations performed on a website server hosting the webpage.

15. A computer system for rendering an image included in requested data based on determined user preferences, the computer system comprising:
    one or more computer processors, one or more computer-readable storage media, and program instructions stored on the one or more of the computer-readable storage media for execution by at least one of the one or more processors capable of performing a method, the method comprising:
       determining elements in a preselected image designed to be included on a webpage that is being requested from a user utilizing a device configured to show the webpage, each of the elements corresponding to a topic;
       determining preferences associated with the user, the preferences indicative of topics of interest associated with the user; and
       generating a modified version of the preselected image based on the elements and the preferences, the modified version of the preselected image showing one of the elements of the preselected image with the topic that corresponds to one of the topics of interest associated with the user such that a further one of the elements of the preselected image is not visible,
    wherein the webpage is loaded on the device with the modified version of the preselected image being rendered.

16. The computer system of claim 15, wherein the method further comprises:
    determining technical parameters of the device, the technical parameters indicative of display characteristics of the webpage.

17. The computer system of claim 16, wherein the method further comprises:
    determining modifiable attributes of the elements, the modifiable attributes retaining a respective context of the elements.

18. The computer system of claim 17, wherein the modified version of the preselected image is generated with at least one image treatment based on the modifiable attributes, the image treatment including at least one of a re-focusing, a cropping, a panning, a tilting, a zooming in, a zooming out, a rotating, and a flipping.

19. The computer system of claim 15, wherein the preferences are based on at least one of a browsing history of the user and sensory information associated with the browsing history.

20. The computer system of claim 15, wherein the image is in a leadspace of the webpage.

* * * * *